United States Patent [19]
Okura et al.
[11] 4,327,433
[45] Apr. 27, 1982

[54] MAGNETIC PHONO CARTRIDGE

[75] Inventors: Keniti Okura; Kazuo Nishikawa, both of Tokorozawa, Japan

[73] Assignee: Pioneer Electronic Corporation, Tokyo, Japan

[21] Appl. No.: 191,059

[22] Filed: Sep. 25, 1980

[30] Foreign Application Priority Data

Sep. 25, 1979 [JP] Japan ............ 54-121946
Sep. 25, 1979 [JP] Japan ............ 54-121947

[51] Int. Cl.³ ............ G11B 3/30
[52] U.S. Cl. ............ 369/139; 369/170; 369/147
[58] Field of Search ............ 369/147, 146, 148, 136, 369/170, 139, 149

[56] References Cited

U.S. PATENT DOCUMENTS 3,542,972 11/1970 Brown ............ 369/136
3,956,598 5/1976 Kawahami ............ 369/136
4,090,039 5/1978 Mori ............ 369/147
4,161,631 7/1979 Matsuda ............ 369/147
4,177,360 12/1979 Fujimoto ............ 369/146
4,237,349 12/1980 Hansen ............ 369/147

*Primary Examiner*—Bernard Konick
*Assistant Examiner*—Alan Faber
*Attorney, Agent, or Firm*—Sughrue, Mion, Zinn, Macpeak and Seas

[57] ABSTRACT

A pick-up phono cartridge in which the position of an armature disposed at a base end of a cantilever is made adjustable to thereby produce a desired output voltage. A vibrating system of the cartridge includes an armature secured to a base end of a cantilever having a stylus secured to the other end thereof. A center axis of the cantilever is vibratable around a predetermined position on the armature. A fixed system is provided including at least a front yoke and a rear yoke which are positioned to nearly clamp the armature. The vibrating system is made adjustable in the axial direction of the cantilever upon loosening a stop screw.

8 Claims, 3 Drawing Figures

MAGNETIC PHONO CARTRIDGE

BACKGROUND OF THE INVENTION

The present invention relates to a phono pick-up cartridge for a record player. More specifically, the present invention relates to a magnetic type phone pick-up cartridge.

Prior art magnetic phono pick-up cartridges have been commercially available for a number of years and have been used in applications requiring a broad frequency response. However, the prior art magnetic phono pick-up cartridges suffered from a number of defects. In these cartridges, both the holder for the cantilever holding the stylus and the vibrating body attached thereto häd to be magnetic. A large magnetic yoke, which most commonly included only front and center members, had to be made very heavy as did the holder and vibrating body. Also, most generally, air core coils could not be used, and each coil had to be provided with a core of magnetic material.

Because of this, the compliance of the vibrating system of the cartridge was rather low and a high stylus pressure was needed. A rubber damper attached to the cantilever had to be made from a relatively hard rubber in order to firmly mount the stylus due to the high stylus pressure. As a result, the magnetic efficiency of the cartridge was quite low typically only several percent. Yet further, no adjustment could be made to align the coils with the magnetic circuit. This led to an unbalance in some situations in the output signals from the left and right channels.

Accordingly, it is an object of the invention to provide a magnetic phono pick-up cartridge in which all of these defects are eliminated.

More specifically, an object of the present invention is to provide such a phono pick-up cartridge in which the weight of the components used therein is relatively small, and in which a high stylus pressure need not be used.

Still further, it is an object of the present invention to provide such a cartridge in which a relatively soft rubber damper can be used to improve the frequency response thereof, and to provide such a cartridge in which the magnetic efficiency is relatively high.

SUMMARY OF THE INVENTION

These, as well as other objects of the invention, are met by a phono pick-up cartridge including a vibrating system composed of a non-magnetic vibrating body secured to a base end of a cantilever having a stylus at the other end thereof. First and second coils are provided having winding axes parallel to the cantilever and which are secured to the vibrating body. The vibrating system is vibratable around the center axis of the cantilever in the vibrating body. A magnetic circuit is provided for applying magnetic flux to the outer portion of the coils normal to the winding axes of the coils.

In another preferred embodiment, the vibrating system is made adjustable in the axial direction of the cantilever. In this case, a fixed system is provided including at least a front yoke and a rear yoke which nearly clamp the armature. A center yoke may also be provided. The cartridge may be of the MC type in which case the armature of the vibrating system is composed of coils having winding axes parallel to the center axis of the cantilever and magnetic flux is applied to the outer portions of the coils from the center, front and rear yokes to the winding axes of the coils. Also, the cartridge may be of the MM type in which case the armature of the vibrating system is composed of coils having winding axes parallel to the center axis of the cantilever and magnetic flux is applied to the outer portions of the coils from the center, front and rear yokes to the winding axes of the coils. Still further, the cartridge may be of the MI type in which case the armature of the vibrating system is made up of a magnetic body and the center, front and rear yokes have an E-shape, and coils are provided on one of the center yoke and the front and rear yokes. A magnet is provided for applying flux to the center yoke and front yoke and to the center yoke and rear yoke.

DESCRIPTION OF THE PREFERRED EMBODIMENTS

Figure 1:
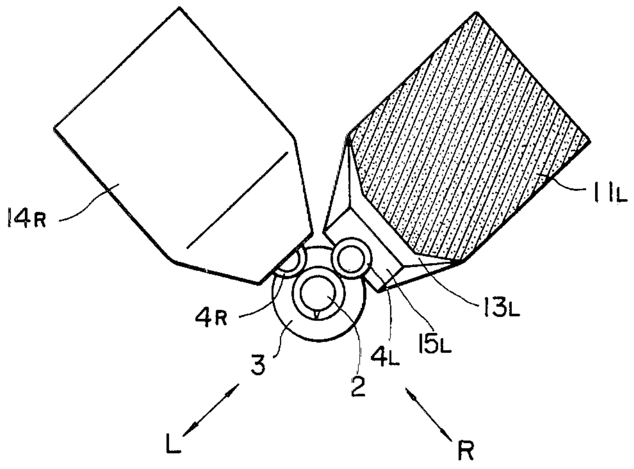
FIG. 1 is a front view showing a MC pick-up cartridge of a preferred embodiment constructed according to the present invention.
Figure 2:
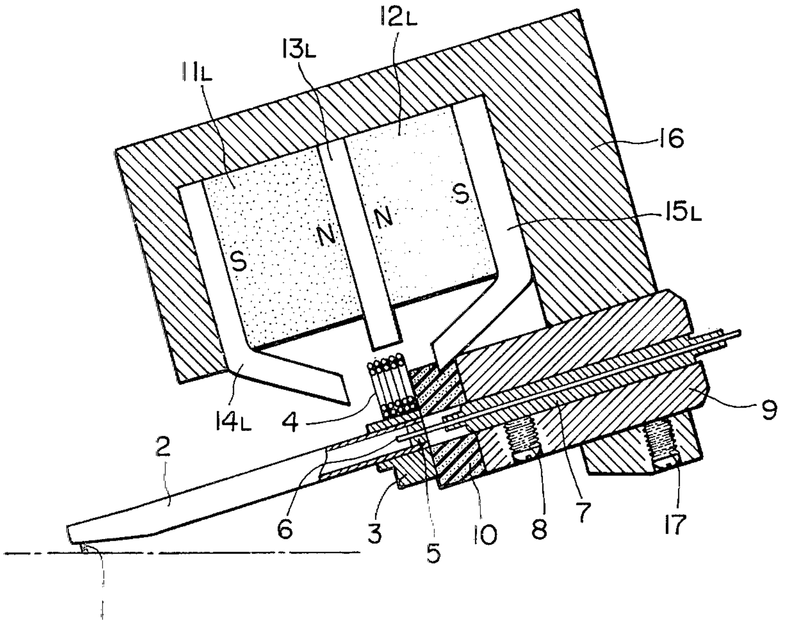
FIG. 2 is a side view of the L-channel of the cartridge of FIG. 1.

A preferred embodiment of a phono pick-up cartridge constructed according to the present invention will now be described with reference to the accompanying drawings.

A vibrating body 3 made of non-magnetic material is mounted on a base end of a cantilever 2 having a stylus 1 at its front end. Hollow armature coils 4L and 4R are mounted on the vibrating body 3 forming an angle of 45° with respect to an extension of the axis of the stylus 1. An end of a "piano" wire 6 is attached to a base end of the cantilever 2 through an insert member 5. The other end of the piano wire 6 is attached to a suspension member 7 which is secured to a holder 9 but adjustable to move in the axial direction upon loosening a stop screw 8. Reference numeral 10 denotes a damper for damping the vibration of the vibrating body. The compliance thereof is adjustable by the tension of the suspension 7. The vibrating system is thus constructed so that the cantilever 2 is vibratable around the center of the vibrating body 3.

Figure 3:
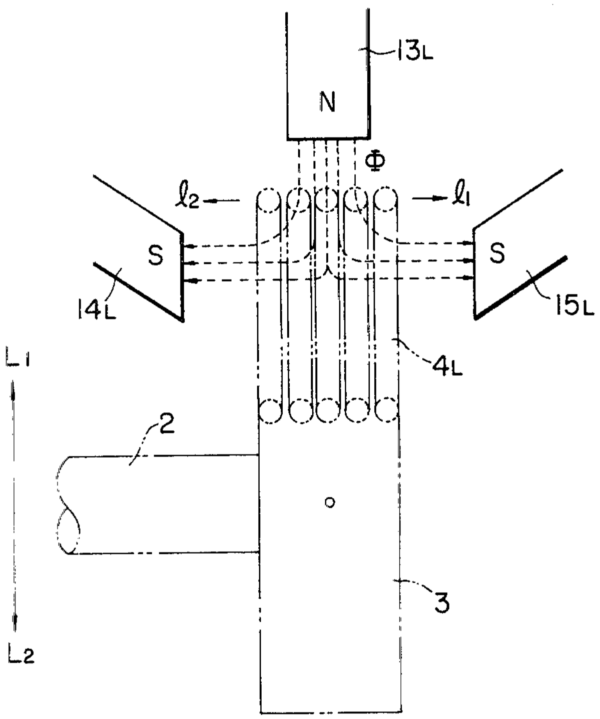
FIG. 3 is an illustration of the voltage induced with the cartridge of FIG. 1.

Magnets 11L and 12L having the same magnetic strengths are mounted so as to clamp a yoke 13L in the middle, and with the magnets face each other. A front yoke 14L and a rear yoke 15L are mounted on opposite magnetic poles (S-poles) of the respective magnets. The magnetic circuit on the L-channel formd by these members is mounted on a non-magnetic frame 16. The end portions of the center yoke 13L, the front yoke 14L and the rear yoke 15L are directed to the coil 4L surrounding the peripheral portion of the coil 4L. Namely, as shown in FIG. 3, the yokes are arranged so that the magnetic flux Φ emanating from the center yoke 13L flows from the outside of the coil 4L toward the center thereof. The R-channel magnetic circuit is arranged and constructed in the same manner so that a similar magnetic flux pattern is formed with respect to the coil 4R. In the drawings, corresponding parts for the right channel are designated by the same reference numerals as for the left channel but with suffixes R. The frame 16 supporting the magnetic circuit is attached to the holder 9 by the stop screw 17.

In the above system, when the cantilever 2 is positioned at a neutral position, the coil 4L is at a middle position between the ends of the front and rear yokes 14L and 15L as shown in FIG. 3, that is, in front of the center yoke 13L. In this case, when the cantilever 2 is displaced in the direction $L_1$, since the coil 4L is moved in the direction $l_1$, it transverses the magnetic flux $\Phi$ emanating from the yoke 13L. As a result, a polarized voltage is induced. On the other hand, when the cantilever 2 is displaced in the opposite direction $L_2$, since the coil 4L is moved in the direction $L_2$, a voltage having the opposite polarity to the first polarized voltage is induced. At this time, the coil 4R is only rotated in front of the center yoke of the R-channel so that no voltage is induced.

When the cantilever 2 vibrates in the direction R in the opposite direction to that described above, a voltage is induced in the coil 4R and no voltage is induced in the coil 4L. Accordingly, good separation between the R- and L-channels is attained.

Adjustment of the compliance of the damper 10 is achieved by loosening the screw 8 and moving the suspension 7 in the axial direction. The vibrating body 3 is simultaneously moved. As a result, the coils 4L and 4R secured to the vibrating body 3 are also moved together. Accordingly, the outer portion of the coils 4L and 4R are displaced from the outer yoke of the magnetic circuit so that the center of the outer parts of the coils 4L and 4R in the static state are not at the position of maximum magnetic flux density. As a result, with respect to the L-channel, although the cantilever 2 is displaced from the neutral position in the direction $L_1$ at the same angle and at the same speed, the magnitudes of the induced voltages are different from each other.

However, in the system according to the present invention, since it is possible to adjust the relationship between the magnetic circuits and the coils 4L and 4R in the axial direction of the cantilever by loosening the stop screw 17, when the compliance of the damper 10 is adjusted as mentioned above, the coils 4L and 4R can be adjusted to directly face the center yoke to generate a desired voltage.

The invention has been described as it is applied to an MC (moving coil) type phono cartridge. However, it is also applicable in the same manner to an MM (moving magnet) type cartridge in which coils are provided on outer yokes or the center yoke of an E-shaped yoke and magnetic flux emanating from a magnet which is vibrated in response to vibration of a cantilever is directed from the center yoke to the front or rear yoke. In this case, if the position of the magnet is displaced toward the center yoke, due to the polarity difference, a level difference is produced in the generated voltage. This level difference can be readily compensated for according to the present invention. Also, the invention can be applied to an MI (moving iron) type cartridge in the same manner.

As mentioned above, according to the present invention, the level difference in the generated voltage, because of the polarity difference, is compensated for and a desired voltage is induced.

The coils 4L and 4R used in the embodiment are of the hollow type. However, it is possible to attach the coils with an adhesive and it is possible to wind the coils onto non-magnetic, light-weight bobbins.

What is claimed is:

1. A pick-up phono cartridge comprising: a vibrating system comprising a non-magnetic vibrating body secured to a base end of a cantilever having a stylus at the other end thereof; first and second hollow coils having winding axes parallel to said cantilever and secured to said vibrating body, said first and second hollow coils being mounted on said non-magnetic vibrating body and positioned 90° apart from one another so that said first and second hollow coils are each disposed apart from the center axis of said cantilever, said vibrating system being vibratable around the center axis of said cantilever in said vibrating body; and a magnetic circuit for applying magnetic flux to the outer portion of said hollow coils normal to said winding axes of said coils, said magnetic circuit comprising front, center and rear yokes with poles, a line defined by said side poles being substantially arranged in parallel to the center axis of said cantilever, said center pole being arranged outside of the outer periphery of said coils and said front and rear poles being positioned outside of said coils so as to face each end of said coils.

2. The pick-up cartridge claimed in claim 1, wherein said magnetic circuit further comprises two magnets having poles, the same poles of the magnets confronting each other, and said center yoke being clamped between said same poles.

3. The pick-up phono cartridge claimed in claim 1, further comprising a holder body for holding said vibrating system thereto, non-magnetic frame means for supporting said magnetic circuit to said holder body, and adjustable fixing means for adjustably fixing said vibrating system and said non-magnetic frame means to each other.

4. A pick-up phono cartridge comprising: a holder body having a longitudinal hole formed therein; a damper member positioned adjacent one end of said holder body, said damper member having a hole therethrough aligned with said hole in said holder body; a cantilever having a stylus rigidly secured to one end thereof; a vibrating body secured to the other end of said cantilever, said vibrating body being mounted at the end of said damper member opposite said holder body; a suspension member disposed in said hole in said holder body; stop means, said suspension member being slidable in said holder body upon loosening said stop means and being fixed in position upon tightening said stop means; a wire extending from said suspension member and being secured to the other end of the cantilever; left and right coils mounted on said vibrating body and positioned 90° apart from one another; right and left channel magnetic circuits, each of said coils being disposed in a magnetic gap defined by each of said magnetic circuits: non-magnetic frame means for supporting said magnetic circuits; fixing means for fixing said non-magnetic frame means to said holder body for allowing the relative positions of said magnetic circuits and said coils to be adjusted by loosening said fixing means and positioning said cantilever without affecting inner stress generated in said damper member.

5. The pick-up phono cartridge claimed in claim 4, wherein said fixing means comprises a screw.

6. The pick-up phono cartridge claimed in claim 4, wherein each of said magnetic circuit comprises front, center and rear yokes, said yokes applying magnetic fields to the corresponding coils, said center yoke being positioned so as to direct a magnetic field applied therethrough to the side of the corresponding coil perpendicular to the winding axis of said coil and said front and rear yokes directing a magnetic field applied parallel to said winding axis of said coil.

7. The pick-up phono cartridge claimed in claim 4, wherein said coils are hollow.

8. The pick-up phono cartridge claimed in claim 4, wherein said coils are adjustably movable in the axial direction of said cantilever and in a direction wherein poles of said magnetic circuits are substantially aligned in one line.

* * * * *